(12) United States Patent
Kobayashi

(10) Patent No.: US 7,221,468 B2
(45) Date of Patent: May 22, 2007

(54) NONVOLATILE MEMORY LIFE PROLONGING CIRCUIT AND IMAGE FORMING APPARATUS

(75) Inventor: Kazunori Kobayashi, Toyou-To (JP)

(73) Assignee: Ricoh Company, Ltd., Tokyo (JP)

( * ) Notice: Subject to any disclaimer, the term of this patent is extended or adjusted under 35 U.S.C. 154(b) by 1022 days.

(21) Appl. No.: 10/096,818

(22) Filed: Mar. 14, 2002

(65) Prior Publication Data
US 2002/0131085 A1    Sep. 19, 2002

(30) Foreign Application Priority Data
Mar. 15, 2001 (JP) .............................. 2001-074365
Jul. 23, 2001 (JP) .............................. 2001-221816

(51) Int. Cl.
*G06F 3/12* (2006.01)
*G06K 15/00* (2006.01)
(52) U.S. Cl. ..................................... 358/1.15; 358/1.16
(58) Field of Classification Search ............... 358/1.14, 358/1.15, 1.13, 1.16, 1.17, 1.9, 1.6, 1.1, 407, 358/404, 444, 468
See application file for complete search history.

(56) References Cited
U.S. PATENT DOCUMENTS
4,901,273 A * 2/1990 DiGiulio ..................... 705/410

5,835,816 A     11/1998  Sawada et al.
6,172,936 B1 *  1/2001   Kitazaki ..................... 365/233

FOREIGN PATENT DOCUMENTS

| EP | 0 566 264 | 10/1993 |
|---|---|---|
| EP | 0 859 489 | 8/1998 |
| EP | 0 905 963 | 3/1999 |
| EP | 0 946 046 | 9/1999 |
| EP | 1 043 885 | 10/2000 |
| GB | 2 244 582 | 12/1991 |

OTHER PUBLICATIONS

U.S. Appl. No. 10/352,594, filed Jan. 29, 2003, Kobayashi.

* cited by examiner

*Primary Examiner*—Dov Popovici
(74) *Attorney, Agent, or Firm*—Oblon, Spivak, McClelland, Maier & Neustadt, P.C.

(57) ABSTRACT

An image forming apparatus includes a volatile memory configured to temporarily store usage information of the image forming apparatus, and a non-volatile memory configured to finally store the usage information. An access control device is provided to access the non-volatile memory and output at least an address, data, and a control signal thereto as private use signals independent from a control of the CPU. The access control device may copy the usage information of the non-volatile memory to the volatile memory before image formation is started, and periodically update the non-volatile memory with new usage information temporarily stored in the volatile memory during the image formation.

21 Claims, 14 Drawing Sheets

NONVOLATILE MEMORY LIFE PROLONGING CIRCUIT AND IMAGE FORMING APPARATUS

CROSS-REFERENCE TO RELATED APPLICATIONS

This document claims priority under 35 U.S.C. § 119 to Japanese Patent Application Nos. 2001-074365 and 2001-221816 filed in the Japanese Patent Office on Mar. 15, 2001, and Jul. 23, 2001, respectively, the entire contents of which are hereby incorporated herein by reference.

BACKGROUND OF THE INVENTION

1. Field of the Invention

The present invention generally relates to image forming apparatuses, such as printers, copiers, facsimiles, etc., and more particularly to image forming apparatuses capable of efficiently accessing a non-volatile memory, which stores maintenance and supervisory information related to the image forming apparatuses, and capable of obtaining a high performance while reducing load on a CPU.

2. Discussion of the Background

Recently, various high value-added functions are proposed to be equipped with image forming apparatuses such as digital copiers, etc., and are gradually being adopted therein. For example, usage career data, such as indicating a number of used sheets and so on, is stored in a non-volatile memory, and a parameter for controlling an image forming process is changed in accordance with the usage career data to thereby obtain a stable image over a long period of time. In addition, career data related to a problem such as a paper jam, a self-diagnosis error, etc., is also stored in the non-volatile memory, and maintenance is performed in accordance with the career data as appropriate. Further, data indicating a unique operational procedure is also stored in the non-volatile memory per a user or an objective job so that an operational condition can be set and customized. Thus, the above-described usage information is included, for example, in a digital copier as important information to improve usability when a maintenance is performed and the image forming apparatus is supervised. Accordingly, the usage information should not be subject to a problem such as a data crash.

For a non-volatile memory storing such usage career data, a NVRAM (Non-Volatile Random Access Memory) or an EEPROM (Electrically Erasable and Programmable Read Only Memory) is frequently employed. The NVRAM is generally more compact and cheaper than a magnetic memory such as a hard disc memory, and generally has an advantage that a backup use power supply is unnecessary when compared with a DRAM (Dynamic Random Access Memory) and an SRAM (Static Random Access Memory). The NVRAM includes a memory cell composed of a pair of cells of the SRAM and EEPROM and functions to store data of the SRAM into the EEPROM. The NVRAM recalls data of the EEPROM to the SRAM. In addition, depending upon a usage manner, the NVRAM does not have to consider a life of the EEPROM. However, a variety in NVRAM rarely exists and the NVRAM is sometimes costly when compared with an EEPROM.

In contrast, the EEPROM includes varieties and is relatively cheaper. However, a memory such as an EEPROM generally has a lifetime limited by a number of rewriting times (e.g. from a few thousand to a few hundred-thousand times). Thus, if rewriting in the EEPROM is performed every access to the CPU, an expected product life of an image forming apparatus may not coincide with the life of the EEPROM. As a result, an operation of the image forming apparatus is not assured.

In view of such an aspect, an accessing system is proposed. For example, a working area is formed in a section of a memory such as an SRAM, a DRAM, etc., and contents (data) in the EEPROM are copied to the working area when the electrical power is supplied to the image forming apparatus. Typical reference and update operations are performed with regard to the working area, and the contents of the EEPROM are periodically updated by the contents of the working area. In such a situation, a value obtained by dividing a lifetime (e.g. 5 to 10 years) of the digital copier with a number of times that an EEPROM can be accessed can be set as a number of times for updating the EEPROM.

FIG. 12 illustrates an exemplary control section that operates in accordance with the background accessing operation. A main control section 21 of a digital copier is controlled by a CPU 211, and includes a ROM 212, an operation memory 213, e.g. a working memory, a timer 214, and a non-volatile memory 215, respectively, connected to each other by a CPU bus. The CPU 211 of the main control section 21 performs a series of control operations in accordance with a control program stored in the ROM 212 after the electrical power is supplied (ON).

The operation memory 213 is utilized as a working area, and the non-volatile memory 215 is utilized to store a variety of important information to be preserved together with the above-described usage information. The timer 214 is provided to generate a timing signal for periodically updating the non-volatile memory 215.

FIG. 13 illustrates a background operation control flow for reading and writing data from and to a non-volatile memory in the system of FIG. 12. Referring to FIG. 13, the electrical power is initially supplied (step S61), and data of the non-volatile memory 215 is simultaneously copied to the operation memory 213 (step S62). Then, reference and update operations are performed (not shown in the flow) with regard to the operation memory 213 to change usage information stored therein in accordance with a change in usage information when an image forming apparatus is operated. However, the non-volatile memory 215 is not accessed. Subsequently, the timer 214 performs a timing and determines a preset writing cycle (step S63), and data of the operation memory 213 is copied to the non-volatile memory 215 every timeout (step S64). Then, the timer 214 is reset (step S65), and the flow is terminated.

Such a writing cycle of the timer 214 is generally optionally set. Thus, if the writing cycle is preferably set in view of a rewritable lifetime of the non-volatile memory 215, the lifetime can coincide with a product lifetime of the image forming apparatus.

FIG. 14 illustrates a usage condition of such a background system that updates information stored in the non-volatile memory at a cycle set by the timer. As shown in FIG. 14, an update duration of 10 milliseconds for updating the non-volatile memory 215 periodically occupies the CPU bus in a timeout cycle of 80 ms, and accordingly, performing a task A (50 ms) three times and a task B (30 ms) twice takes 240 ms, totally.

Like the control system of FIG. 12, when the operation memory 213 and the non-volatile memory (EEPROM) 215 are connected to the same CPU bus, the CPU bus is occupied by such an updating operation for the non-volatile memory 215 as illustrated in FIG. 14. Thus, if an amount of information to be transferred to the non-volatile memory 215 is small, there is almost no problem. However, based upon the recent tendency to desire high performance, an amount of the information to be preserved in the non-volatile memory 215 is increasing. As a result, updating the non-volatile memory 215 now takes a more significant period of time, and the result is that there is a probability of lowering a performance of the entire system of the image forming apparatus.

SUMMARY OF THE INVENTION

Accordingly, an object of the present invention is to address and resolve the above and other problems and provide a novel image forming apparatus.

The above and other objects are achieved according to the present invention by providing a novel image forming apparatus including a volatile memory configured to temporary store usage information of the image forming apparatus, and a non-volatile memory configured to finally store the usage information. An access control device may be provided to access and output at least address, data, and a control signal to the non-volatile memory as private use signals different from outputs of the CPU. The access control device may copy the usage information stored in the non-volatile memory to the volatile memory, and update the non-volatile memory with information newly stored in the volatile memory.

In another embodiment, an updating device may be provided to periodically update usage information stored in the non-volatile memory at a prescribed timing.

In yet another embodiment, an access cycle changing device may be provided to change a number of cycles for accessing the non-volatile memory based upon a setting.

In yet another embodiment, a switching device may be provided to switch an accessing manner for accessing the non-volatile memory from normal read and write to burst read and write, or vice versa, in accordance with a setting.

In yet another embodiment, the access control device is made into an IC, and one of the access cycle changing device and the access manner switching device is built in the IC.

In yet another embodiment, the volatile memory includes any one of an SRAM and a DRAM built in the IC.

In yet another embodiment, the non-volatile memory includes any one of an EEPROM and a ferroelectric substance memory.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
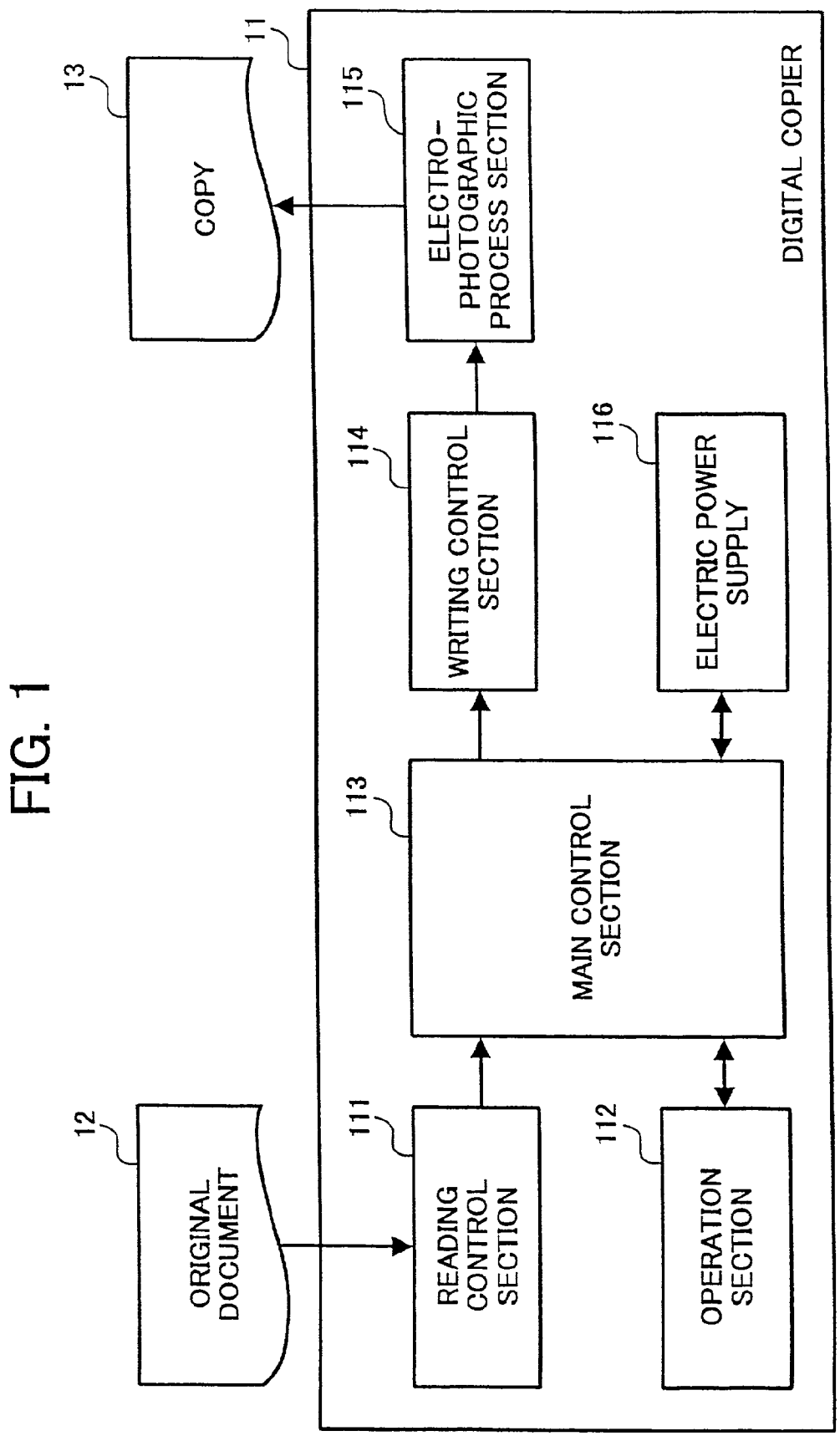
FIG. 1 is a schematic diagram for illustrating a digital copier as one example of an image forming apparatus according to the present invention.

Referring now to the drawings, wherein like reference numerals and marks designate identical or corresponding parts throughout several views, and in particular to FIG. 1, a digital copier 11 is illustrated as one example of an image forming apparatus of the present invention. The digital copier 11 may include a reading control section 111 for reading an original document 12, an operation section 112 for functioning as a user interface, and a power supply 116.

The digital copier 11 may also include a main control section 113 for controlling each of the reading control section 111, the operation section 112, and the power supply 116, and for processing read image data. The digital copier 11 also includes a writing control section 114 for receiving image data from the main control section 113, and an electro-photographic process section 115 for forming an image and a copy in accordance with an output from the writing control section 114.

An operation of the image forming apparatus of FIG. 1 is now briefly described in terms of image data flow. Initially, image data may be read by the reading control section 111 and be subject to a process such as A/D conversion, correction, etc. The image data may further be subject to image processing from an image processing section (not shown) provided in the main control section 113 to be converted into image formation use data, and is then transmitted to the writing control section 114. The writing control section 114 may control a laser diode (not shown) to emit light based upon the image data transmitted from the image processing section. The writing control section 114 may form a latent image on a photoconductive member provided in the electro-photographic process section 115 using a laser beam emitted from the laser diode. Subsequently, a known electro-photographic process may be performed to form a copy 13.

Figure 2:
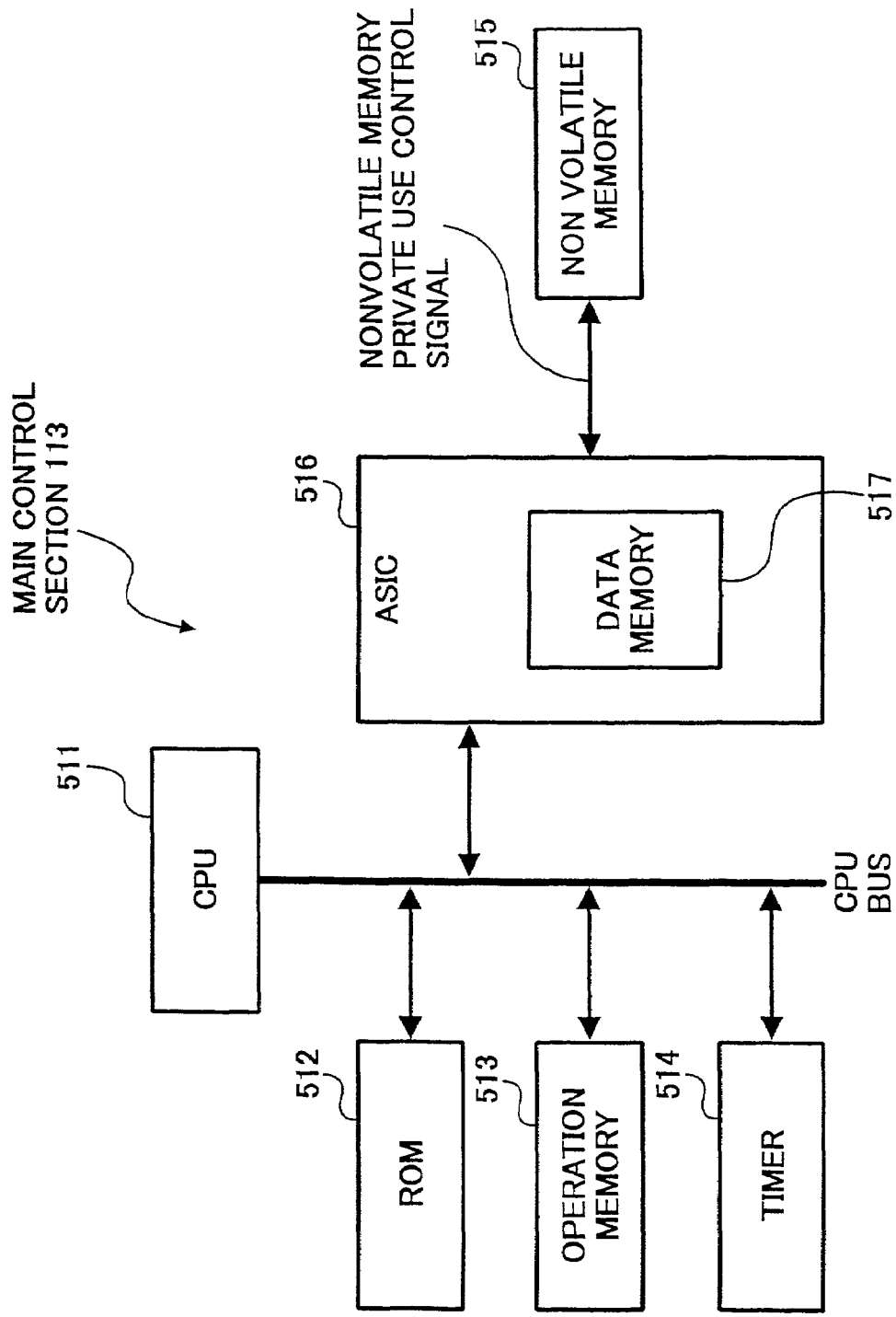
FIG. 2 is a diagram for illustrating hardware of a main control section of the image forming apparatus illustrated in FIG. 1.

FIG. 2 illustrates hardware of the main control section 113 of FIG. 1. As shown in FIG. 2, the main control section 113 may include an ASIC 516 controlled by a CPU 511, a ROM 512, an operation memory 513, a timer 514, and a data memory 517 each connected to the CPU 511 by a CPU bus. The CPU 511 may operate to control the reading control section 111, the operation section 112, and the power supply 116 in accordance with a control program stored in the ROM 512. The CPU 511 may also operate to control the entire image forming apparatus. Data and information such as the control program used for operating the CPU 511 may be stored in the ROM 512. Information necessary for a control operation or that generated during image formation as career data (e.g. a number of copies) or the like may also be stored in the non-volatile memory 515.

Conventionally, a non-volatile memory storing usage information changeable in accordance with usage condition is directly connected to a CPU by a CPU bus similar to a ROM and a working memory. In addition, such a non-volatile memory is accessed to update the usage information under a direct control of the CPU. Accordingly, a performance is lowered as described earlier.

However, in the present invention, a prescribed device may be provided to shorten a period of time the CPU 511 is occupied in updating usage information of the non-volatile memory to be as reduced as possible, to thereby reduce the burden of the CPU 511. As a result, a performance of the entire system may be improved.

Specifically, the ASIC 516 may disable the CPU 511 to directly access the non-volatile memory 515 as illustrated in FIG. 2. The non-volatile memory 515 may then be enabled to communicate a private use control signal with an access control device (not shown) provided in the ASIC 516, and is controlled by the CPU 511 via the ASIC 516. A control operation performed by the CPU 511 is now briefly described.

After the electric power is supplied, the CPU 511 may perform a series of control operations in accordance with the control program stored in the ROM 512. The operation memory 513 may then function as a working area for the CPU 511. By connecting the non-volatile memory 515 to the CPU 511 with a non-volatile memory private use control signal generated by the ASIC 516, the non-volatile memory 515 can be accessed not in synchronism with a control signal of the CPU 511. In addition, the data memory 517 may be a non-volatile memory 515 for the private use.

Accordingly, copying when the electric power is supplied and periodical updating of the non-volatile memory 515 may be performed between the non-volatile memory 515 and the data memory 517. Thus, those operations may not be performed directly to the non-volatile memory 515. In addition, a cycle of updating the non-volatile memory 515 may be adjusted by the timer 514 so that such an updating operation is repeated every time that a prescribed time period has elapsed. Further, such a timer 514 can be built into the ASIC 516.

Figure 3:
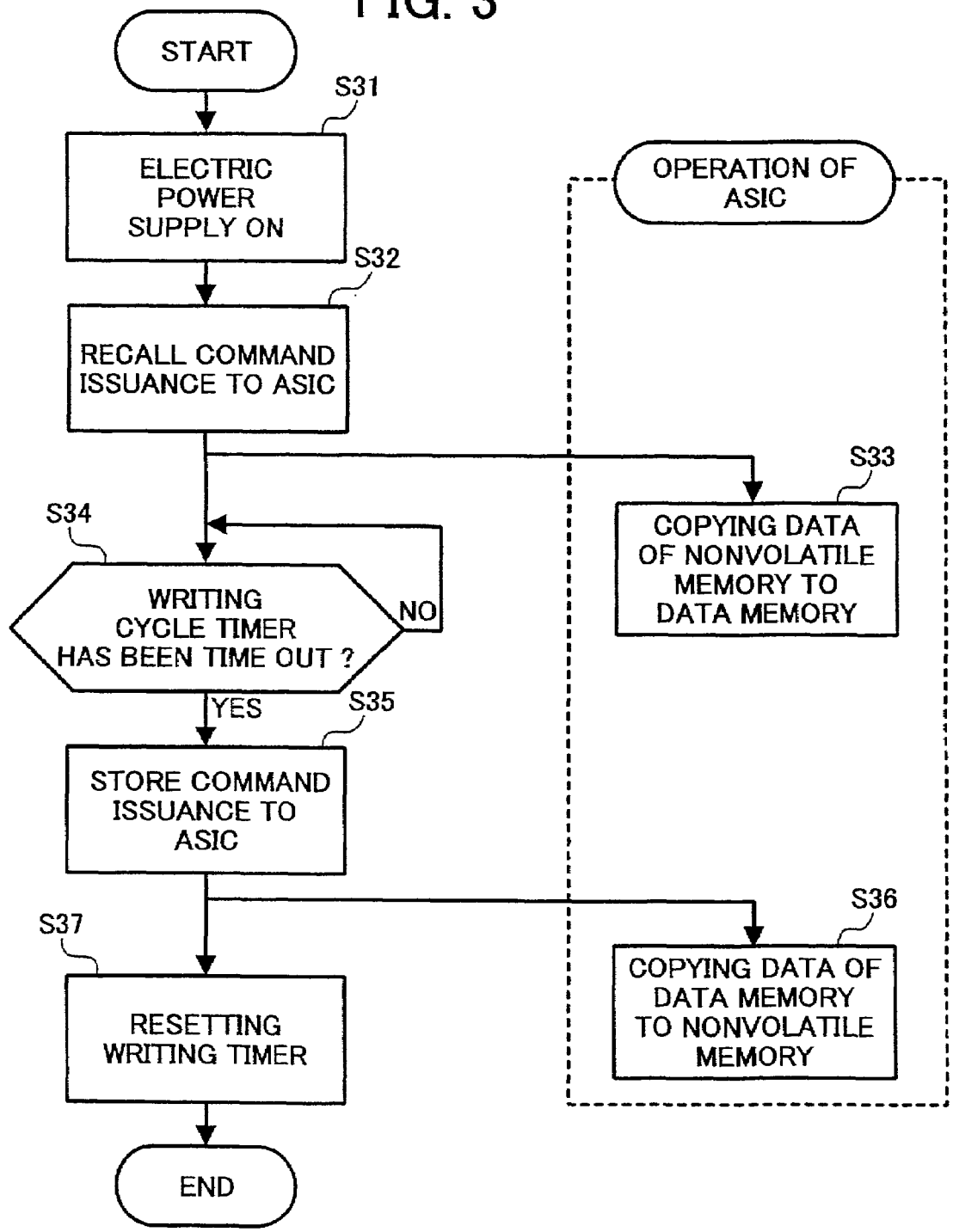
FIG. 3 is a flowchart for illustrating an exemplary data updating process performed with regard to a non-volatile memory of the image forming apparatus illustrated in FIG. 2.

FIG. 3 illustrates an exemplary control flow of a data updating process performed with regard to the non-volatile memory 515 of FIG. 2. Initially, the electric power may be supplied (step S31). Then, the CPU 511 may issue a recall command and enable the ASIC 516 to copy data of the non-volatile memory 515 to the data memory 517 of the ASIC 516 (step S32). The ASIC 516 may receive and execute the recall command, i.e., copy the data of the non-volatile memory 515 to the data memory 517 (step S33), and inform the CPU 511 of termination of the copying. After that, ordinal reference and update operations (not shown) with regard to a variety of usage information, which are performed based upon an operation of the digital copier 11 controlled by the CPU 511, may be directed to the data memory 517. Specifically, the ordinarily performed reference and update operations may not be performed or directed to the non-volatile memory 515.

Further, every time that the timer 514 generates a timeout signal, the data of the data memory 517 may be copied to the non-volatile memory 515. To perform such a copying, a timeout time may optionally be set to the timer 514 to generate the timeout signal. If such a timeout time is set in view of a rewriting lifetime of the non-volatile memory 515, the life of the non-volatile memory 515 can substantially coincide with the lifetime of the product.

In this example as illustrated in FIG. 3, the CPU 511 may initially issue a command instructing that data of the data memory 517 is to be copied to the non-volatile memory 515. The CPU 511 may then check the timeout of the timer 514 (step S34), and issue a store command to the ASIC 516, instructing that data of the data memory 517 should be copied to the non-volatile memory 515, if the timeout is confirmed (step S35). The ASIC 516 may receive and execute the store command and copy the data of the data memory 517 to the non-volatile memory 515 (step S36), and inform the CPU 511 of the termination thereof. The CPU 511 may receive the termination information, and reset the writing timer 514 in order to set the next timeout (step S37). Then, the flow may be terminated.

Figure 4:
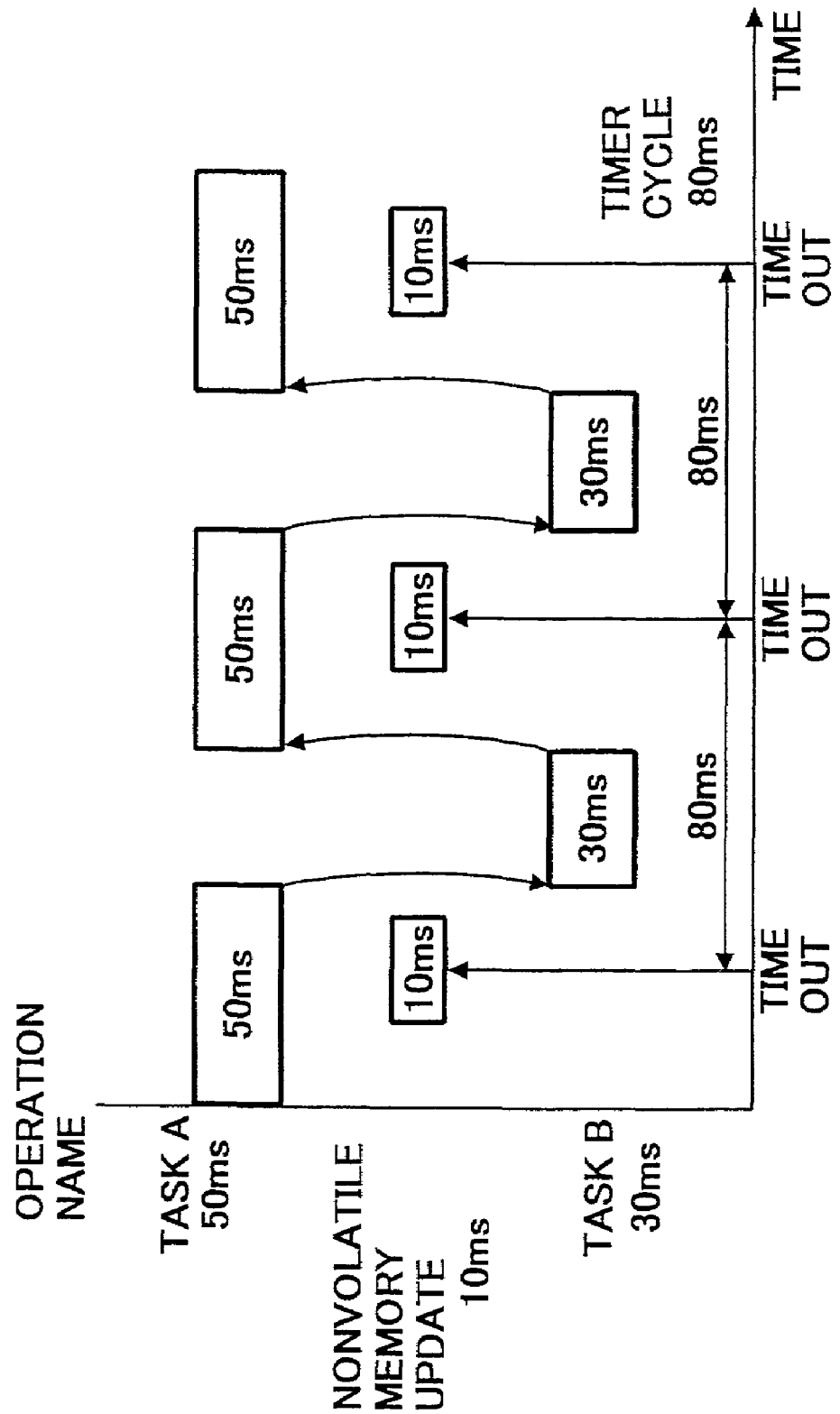
FIG. 4 is a diagram for illustrating one example of a usage condition of a CPU bus of the image forming apparatus illustrated in FIG. 2.
Figure 14:
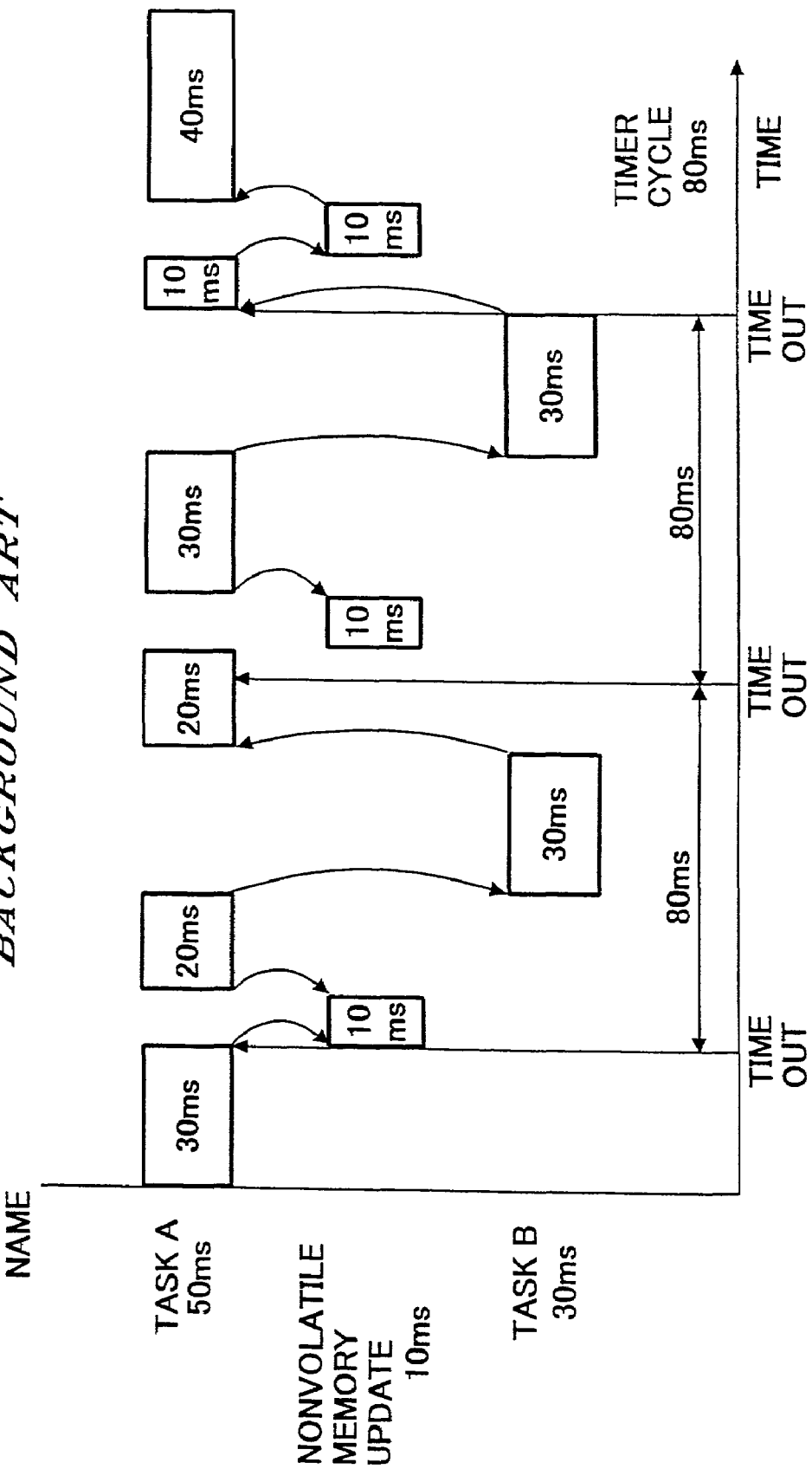
FIG. 14 is a diagram for illustrating a background usage condition of a CPU bus.

Thus, copying the non-volatile memory 515 when the electric power is supplied and periodical copying to the non-volatile memory 515 are asynchronously performed with a control signal of the CPU 511 between the non-volatile memory 515 and the ASIC 516. As a result, a performance of the CPU 511 may not be degraded. FIG. 4 illustrates such a usage condition of the CPU bus, wherein an update is independently performed from an operation of the CPU 511. Since an update of the non-volatile memory 515 for 10 ms does not occupy the CPU bus, executing the task A taking 50 ms three times and executing the task B taking 30 ms twice may be terminated within 210 ms. Therefore, in this example it may be realized that the same tasks as illustrated in the background example of FIG. 14 can be terminated 30 ms earlier in the example of the present invention illustrated in FIG. 4.

Further, an SRAM can be employed as a data memory 517 built in the ASIC 516 to simplify a configuration of a control circuit, because it need not be controlled. Specifically, refreshing and hardwiring to an external device may not be needed due to its installation in the ASIC 516.

A DRAM can also be employed as a data memory 517. Since the DRAM can be a higher capacity storage device in substantially the same cell area as the SRAM, the DRAM may readily handle a non-volatile memory having a high capacity. In addition, since hardwiring to the outside is needless due to its installation in the ASIC 516, configuration of a control circuit can be simplified.

An exemplary access control device and access cycle changing device 518 installed in the ASIC 516 are now described with reference to FIG. 5 as another embodiment. This embodiment aims to readily handle various types of non-volatile memories having different access speeds by changeably setting a cycle of the access to the non-volatile memory.

Figure 5:
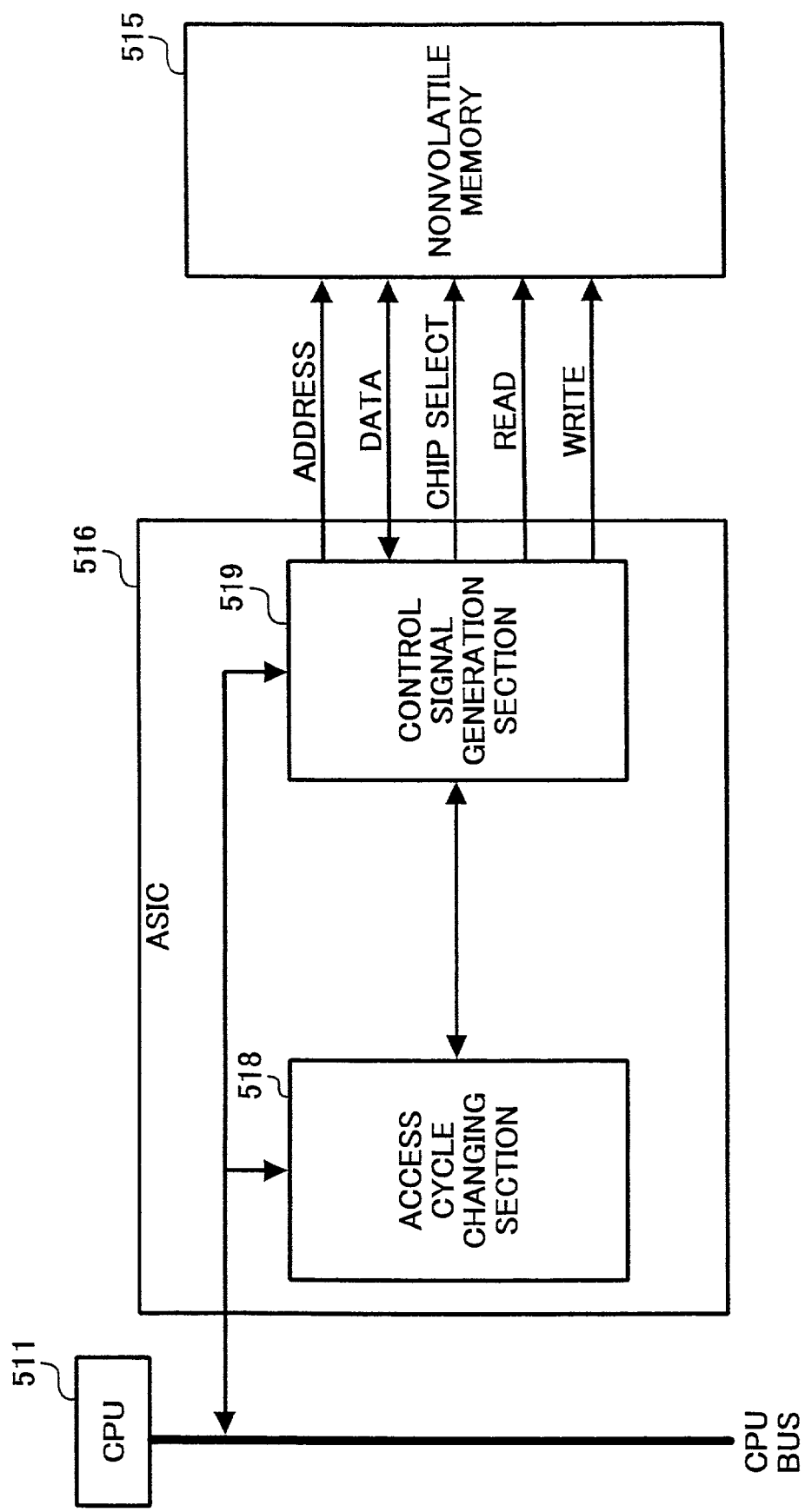
FIG. 5 is a diagram for illustrating details of a main control section illustrated in FIG. 2.

FIG. 5 illustrates the modification of the main control section illustrated in FIG. 2. As shown in FIG. 5, the ASIC 516 may include a control signal generation section 519 serving as an access control device and accessing the non-volatile memory 515 and an access cycle changing section 518 connected to the CPU 511 by the CPU bus. The control signal generation section 519 may generate address, data, chip select, and read and write signals as private use control signals transmitted to the non-volatile memory 515. The control signal generation section 519 may control the data memory 517 to transmit and receive data to and from the non-volatile memory 515. In addition, the access cycle changing section 518 may be enabled to optionally change a cycle of an access to the non-volatile memory 515 based upon an instruction from the CPU 511.

Figure 6:
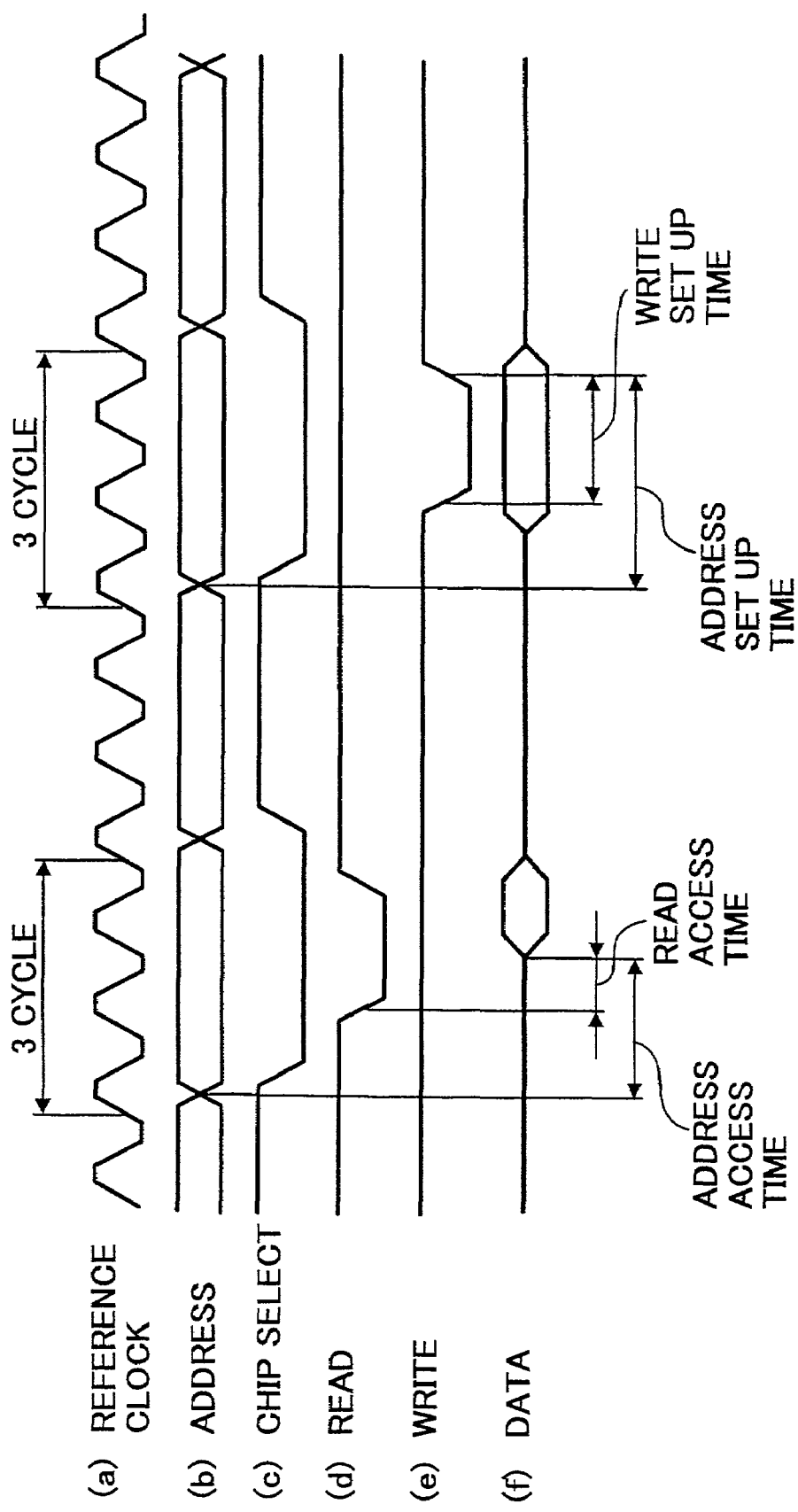
FIG. 6 is a timing diagram for illustrating a relation between a control signal and various data operations when 3 access cycles are set.
Figure 7:
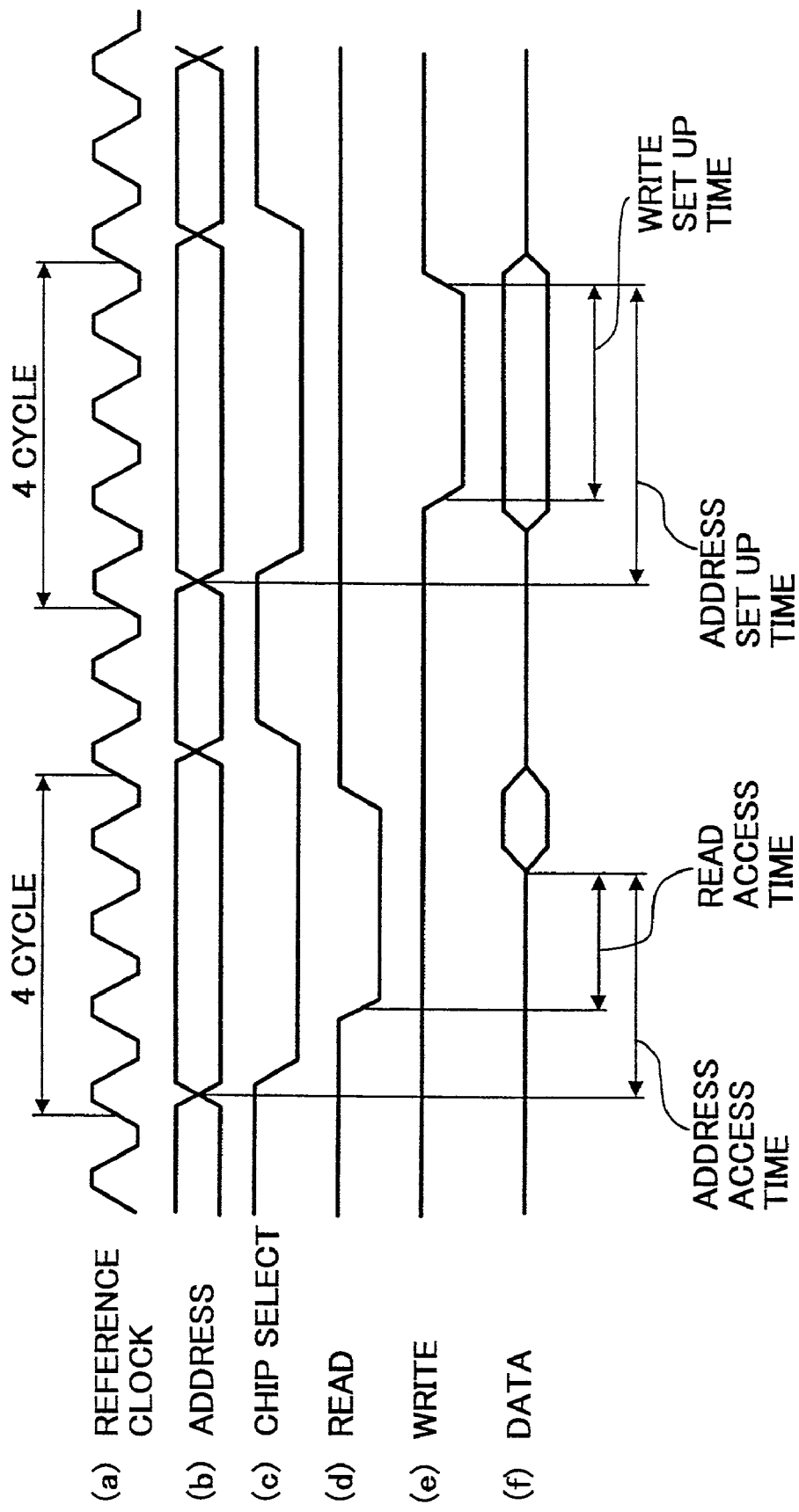
FIG. 7 is a timing diagram for illustrating a relation between a control signal and data when 4 access cycles are set.

FIGS. 6 and 7 are timing diagrams for illustrating control signals and various data operations performed when the access cycle changing section 518 changes an access cycle. The control signal generation section 519 may generate a reference clock as illustrated in the respective drawings. FIG. 6 illustrates a case when an access is performed to the non-volatile memory 515 in 3 cycles of reference clocks, namely the control signal generation section 519 generates respective control signals so that the access can be completed during a time period corresponding to the 3 cycles. FIG. 6 illustrates a relation between a generation timing of a control signal and an accessing time period for accessing a device when both reading and writing are performed. FIG. 7 illustrates a case when a cycle of the access is 4 cycles.

As understood by comparing FIG. 6 with FIG. 7, a read access time, an address access time, a write set-up time, and an address set-up time required when reading and writing are performed in the 4 cycles may be longer than respective of those when performed in the 3 cycles. Thus, an access time may be adjusted in accordance with a number of access cycles. Accordingly, a memory having a slower access time can be handled.

Still another embodiment is now described with reference to the drawings.

When high-speed access to a non-volatile memory is intended, a burst reading and writing are preferable. Such burst reading and writing may enable the ASIC 516 to successively read and write data from and to a plurality of addresses of the non-volatile memory 515. In addition, there sometimes exists a situation when a design around is forcibly needed in view of specifications and cost or the like when a system is designed. Then, this embodiment may propose to readily handle various types of non-volatile memories working in various ways by preferably selecting one of normal and burst reading and writing manners when accessing a non-volatile memory in accordance with a changeably set cycle.

Figure 8:
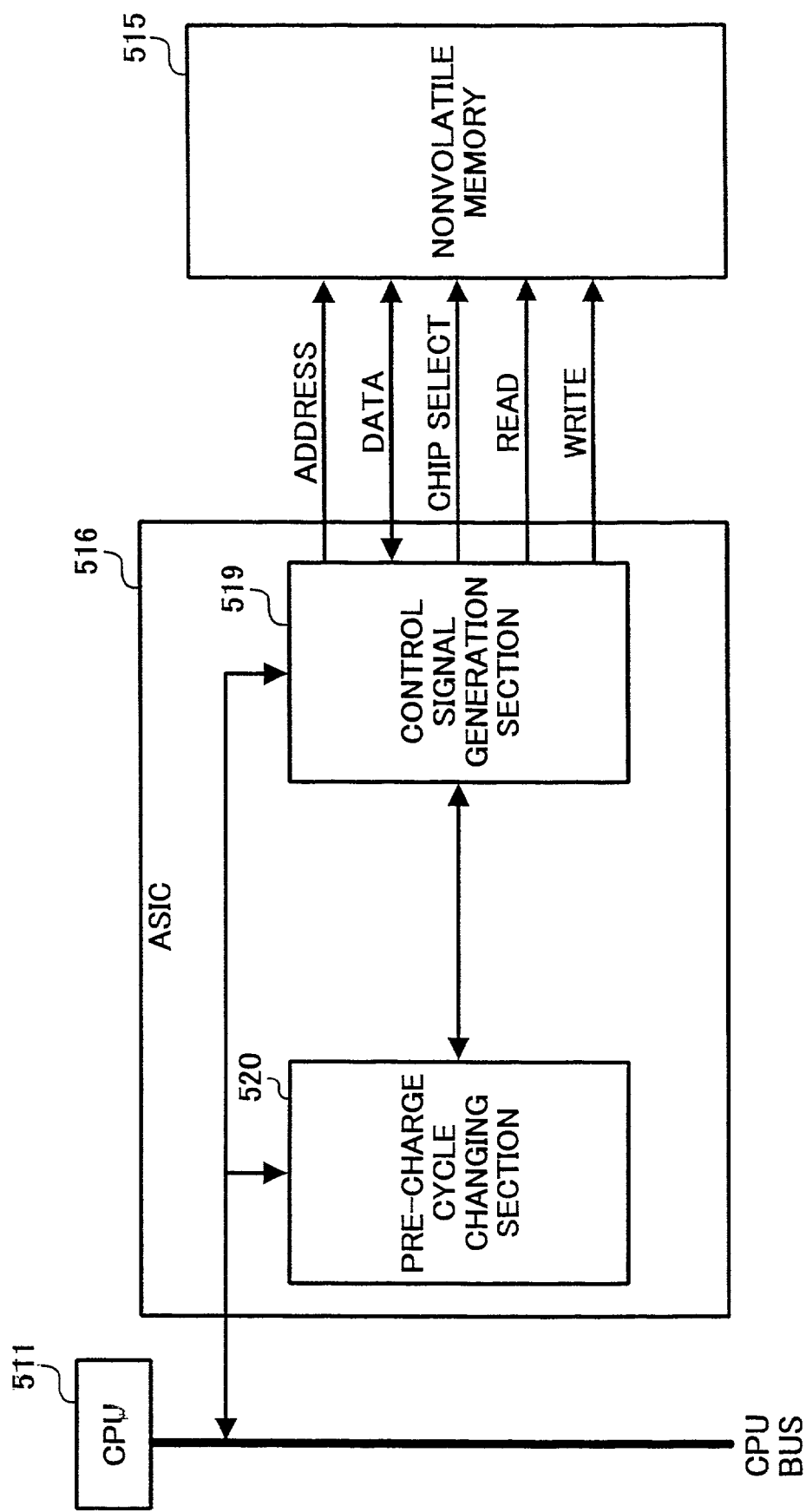
FIG. 8 is a diagram for illustrating a modification of the main control section illustrated in FIG. 2.

FIG. 8 illustrates a main control section of this embodiment. The ASIC 516 includes a control signal generation section 519 serving as an access control device and for accessing the non-volatile memory 515 and a pre-charge cycle changing section 520 connected to a CPU 511 by a CPU bus. The control signal generation section 519 may generate address, data, chip select, and read and write signals as private use control signals to control data transmission performed between the data memory 517 and the non-volatile memory 515. When the normal read is selected as an accessing manner for the non-volatile memory 515, and accordingly a pre-charge is to be performed, a pre-charge cycle changing section 520 capable of optionally selecting insertion of a pre-charge cycle may select a pre-charge cycle. Such selection may be performed based upon an instruction from the CPU 511.

Figure 9:
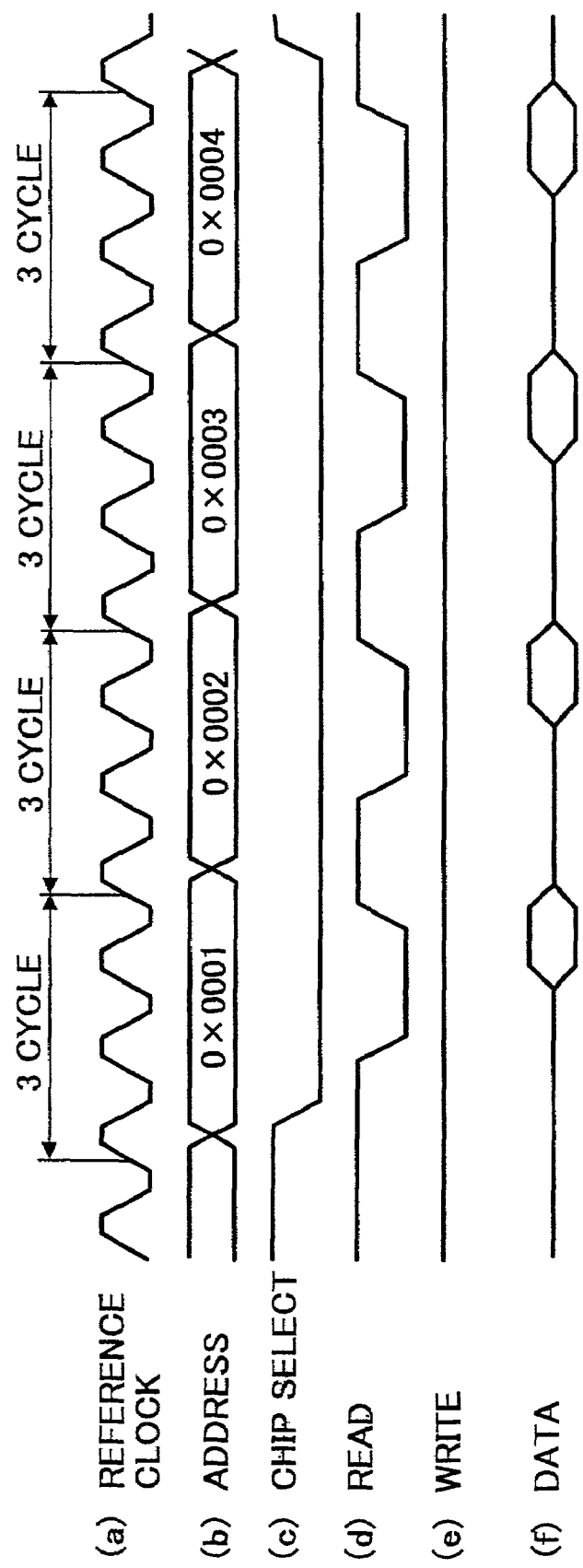
FIG. 9 is a timing diagram for illustrating a relation between a control signal and various data operations when burst reading is selected as an accessing manner.
Figure 10:
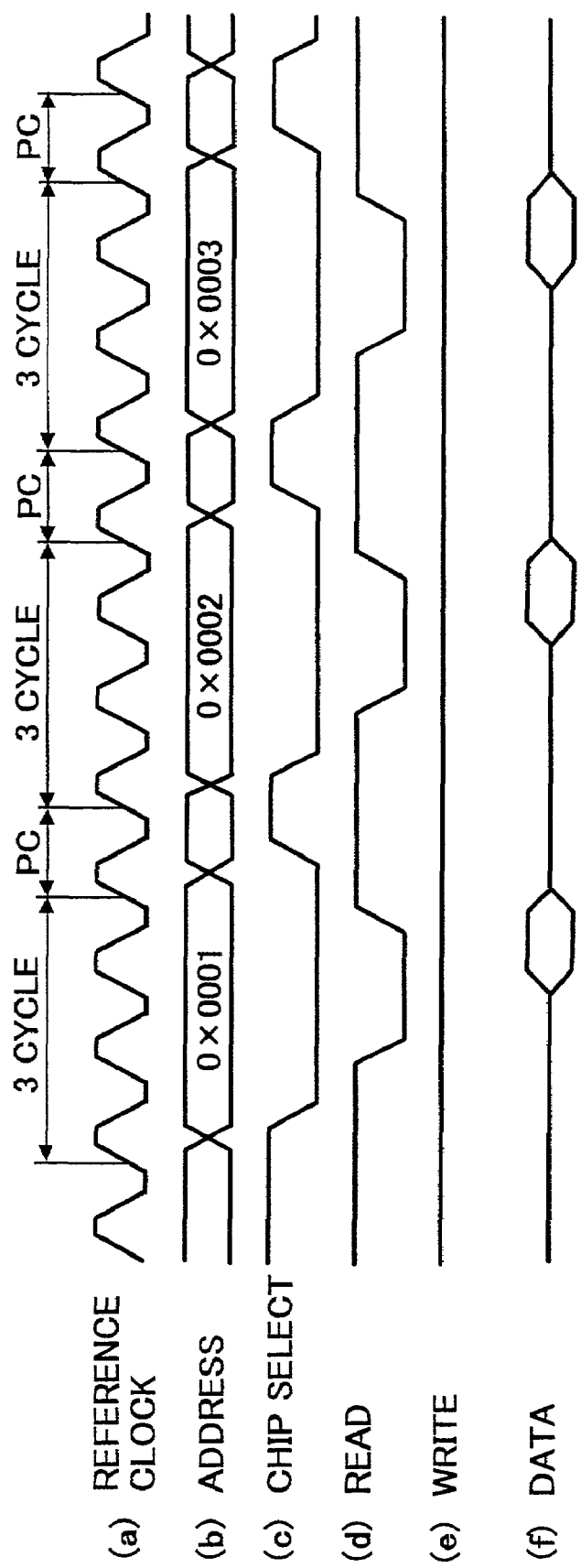
FIG. 10 is a timing diagram for illustrating a relation between a control signal and various data operations when normal reading is selected as an accessing manner.

FIGS. 9 and 10 illustrate timing diagrams for illustrating operations performed when the pre-charge cycle is inserted or omitted, and the burst read or normal read is set through the pre-charge cycle changing section 520. A reference clock illustrated in these drawings may be generated by the control signal generating section 519 of FIG. 8.

FIG. 9 illustrates an access cycle when a burst read is performed from a non-volatile memory. Since the pre-charge process is not inserted, data can be read from different of addresses at a high speed only by changing an address while maintaining a chip select signal active. FIG. 10 illustrates another access cycle when a normal read is performed. As noted from FIG. 10, a pre-charge time period (PC) may be required and the normal read is performed in prescribed cycles in which 1 cycle of a pre-charge time period is added to 3 cycles of an access time period. As a result, data reading may be delayed by the pre-charge time period.

Figure 11:
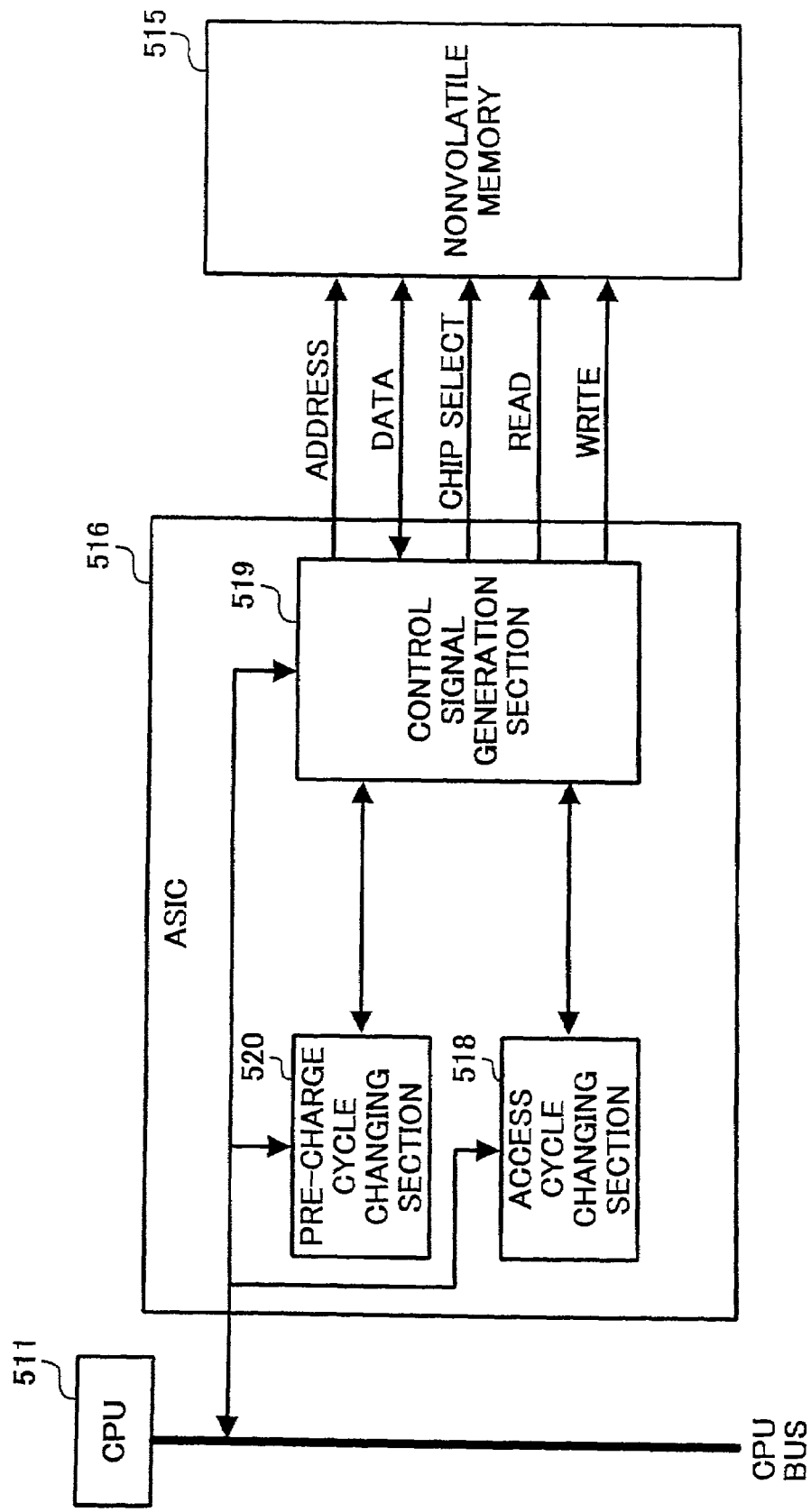
FIG. 11 is a diagram for illustrating another modification of the main control section illustrated in FIG. 2.
Figure 12:
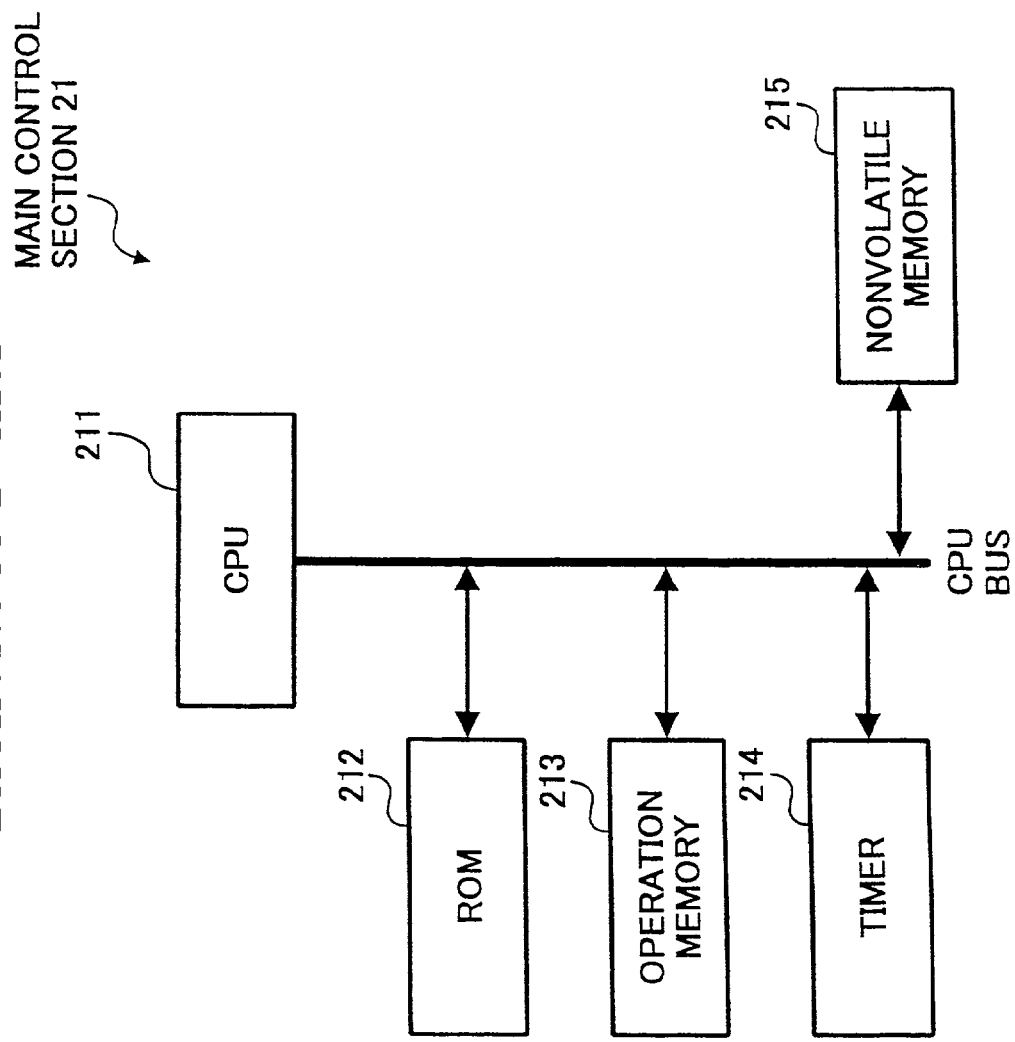
FIG. 12 is a diagram for illustrating an exemplary configuration of a main control section of a digital copier operated in a background manner.
Figure 13:
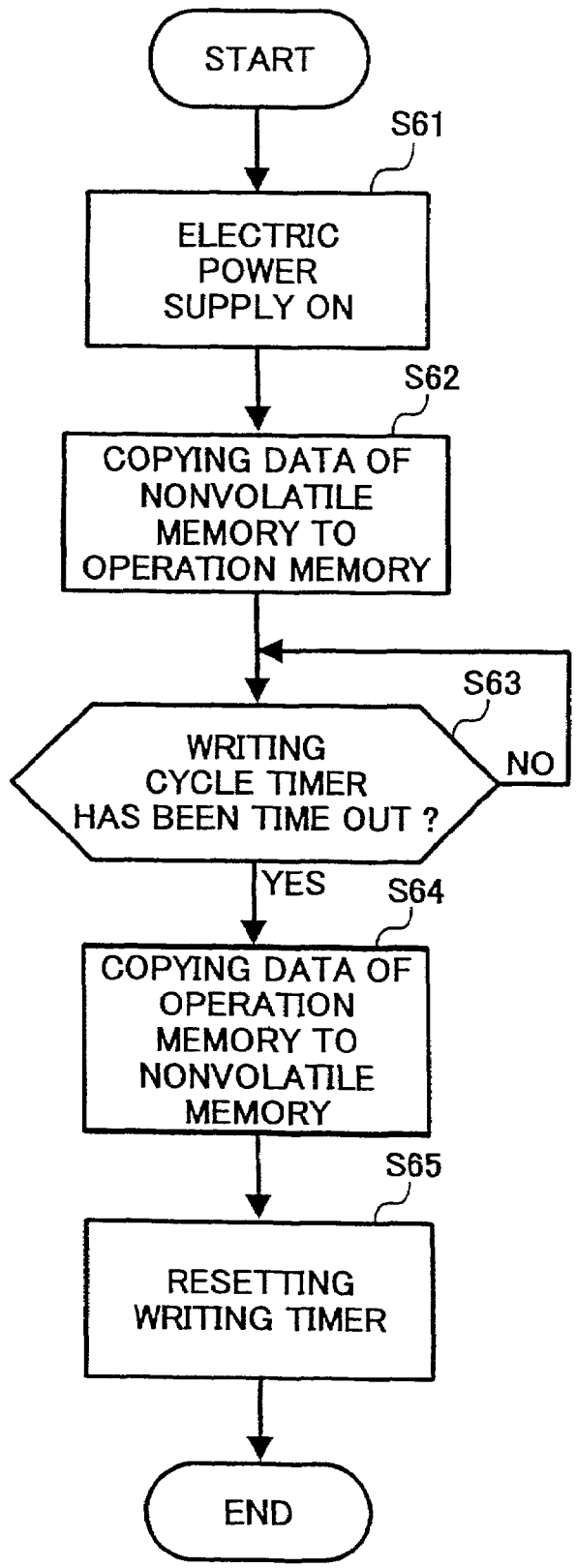
FIG. 13 is a flowchart for illustrating a background control operation performed for the non-volatile memory illustrated in FIG. 12.

When the above-described access is achieved regardless of a type of a non-volatile memory, a device capable of selectively determining access speed and manner may be needed. FIG. 11 illustrates a main control section of such a device.

As shown in FIG. 11, the ASIC 516 includes a control signal generation section 519 serving as an access control device and for accessing the non-volatile memory 515, an access cycle changing section 518, and a pre-charge cycle changing section 520 connected to the CPU 511 by the CPU bus. The control signal generation section 519 again generates address, data, chip select, and read and write signals as private use signals transmitted to the non-volatile memory 515. Thus, the control signal generation section 519 may control data transmission performed between the data memory 517 and the non-volatile memory 515. Each of the control signal generation section 519, the access cycle changing section 518, and the pre-charge cycle changing section 520 operate similarly as corresponding devices described earlier. In addition, the above-described selecting device can be made into an IC and operated with its scale and number of parts kept to minimum levels, respectively.

Further, an EEPROM can be employed at least in a portion of the non-volatile memory, which provides the benefit that the EEPROM is employable in various ways due to its large variations and cheapness. In addition, a ferroelectric substance memory can also be employed in a similar manner, as a ferroelectric substance memory may have a longer rewritable life and a larger capacity than the EEPROM. Owing to these characteristics, occurrence of a data updating error, the possibility of which generally increases in proportion to a frequency of power supply stoppage and an accident, may be decreased.

The mechanisms and processes set forth in the present invention may be implemented using one or more conventional general purpose microprocessors and/or signal processors programmed according to the teachings in the present specification as appreciated by those skilled in the relevant arts. Appropriate software coding can readily be prepared by skilled programmers based on the teachings of the present disclosure, as also apparent to those skilled in the relevant arts. However, as readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product that may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

What is claimed as new and desired to be secured by Letter Patent of the United States is:

1. An image forming apparatus, comprising:
    an image forming section configured to perform image formation in accordance with image data;
    a central processing unit configured to control the image forming apparatus at least by a CPU bus line;
    a volatile memory configured to temporarily store at least usage information, said usage information being replaced with newly generated usage information during the image formation;
    a non-volatile memory configured to permanently store the usage information; and
    an access control device including the volatile memory and configured to receive an access performing signal from the central processing unit to control the volatile memory and to output at least address, data, and a control signal not in synchronism with the access performing signal from the central processing unit when accessing and updating the non-volatile memory with the newly generated usage information of the volatile memory.

2. The image forming apparatus according to claim 1, wherein said output is performed by a private use line other than the CPU bus line connecting the central processing unit to the volatile memory.

3. The image forming apparatus according to claim 1, wherein said updating is performed at a predetermined interval without interfering with a task performed under a control of the central processing unit.

4. The image forming apparatus according to claim 3, wherein said predetermined interval is controlled by a timer connected to the central processing unit.

5. The image forming apparatus according to claim 1, wherein said permanently stored usage information is copied to the volatile memory as temporary usage information before the image formation is started.

6. The image forming apparatus according to claim 1, further comprising an access cycle changing device configured to change a number of cycles in which accessing the non-volatile memory is performed-in accordance with a type of the non-volatile memory.

7. The image forming apparatus according to claim 1, further comprising an accessing manner switching device configured to switch an accessing manner from a normal write mode to a burst read or write mode, and from the burst read or write mode to the normal read or write mode.

8. The image forming apparatus according to claim 1, wherein said access control device is made into an IC.

9. The image forming apparatus according to claim 1, wherein said volatile memory includes an SRAM or a DRAM.

10. The image forming apparatus according to claim 1, wherein said non-volatile memory includes an EEPROM or a ferroelectric substance memory.

11. An image forming apparatus, comprising:
    an image forming section configured to perform image formation in accordance with image data;
    a central processing unit configured to control the image forming apparatus at least by a CPU bus line;
    a volatile memory configured to temporarily store at least usage information, said usage information being replaced with newly generated usage information during the image formation;
    a non-volatile memory configured to permanently store the usage information; and
    access control means including the volatile memory and for receiving an access performing signal from the central processing unit to control the volatile memory and for outputting signals not in synchronism with the access performing signal from the central processing unit when accessing and updating the non-volatile memory with the new usage information of the volatile memory.

12. The image forming apparatus according to claim 11, wherein said output is performed by a private use line other than the CPU bus line connecting the central processing unit to the volatile memory.

13. The image forming apparatus according to claim 11, wherein said updating is
    performed at a predetermined interval without interfering with a task formed under a control of the central processing unit.

14. The image forming apparatus according to claim 13, wherein said predetermined interval is controlled by a timer connected to the central processing unit.

15. The image forming apparatus according to claim 11, wherein said permanently stored usage information is copied to the volatile memory as temporary usage information before the image formation is started.

16. The image forming apparatus according to claim 11, further comprising an access cycle changing means for changing a number of cycles in which accessing the non-volatile memory is performed in accordance with a type of the non-volatile memory.

17. The image forming apparatus according to claim 11, further comprising an accessing manner switching means for switching an accessing manner from a normal write mode to a burst read or write mode, and from the burst read or write mode to the normal read or write mode.

18. The image forming apparatus according to claim 11, wherein said access control means is made into an IC.

19. The image forming apparatus according to claim 11, wherein said volatile memory includes an SRAM or a DRAM.

20. The image forming apparatus according to claim 11, wherein said non-volatile memory includes an EEPROM or a ferroelectric substance memory.

21. An image forming apparatus, means comprising:
    image forming for forming an image in accordance with image data;
    processing means for controlling the image forming apparatus by a processor bus line means;
    volatile memory means for temporarily storing at least usage information, said usage information being replaced with newly generated usage information during the image forming;
    non-volatile memory means for permanently storing the usage information; and
    access control device means including the volatile memory means and for receiving an access performing signal from the processing means to control the volatile memory means and for outputting at least address, data, and a control signal not in synchronism with the access performing signal from the processing means when accessing and updating the non-volatile memory means with the newly generated usage information of the volatile memory means.

* * * * *